(12) United States Patent
Buchner et al.

(10) Patent No.: US 9,187,680 B2
(45) Date of Patent: Nov. 17, 2015

(54) HOT-SEALABLE COATING SYSTEMS AND METHOD FOR JOINING SURFACES

(75) Inventors: Jörg Buchner, Bergisch Gladbach (DE); Harald Kraus, Leverkusen (DE); Matthias Wintermantel, Bergisch Gladbach (DE); Dirk Achten, Leverkusen (DE)

(73) Assignee: Bayer Intellectual Property GmbH, Monheim (DE)

( * ) Notice: Subject to any disclaimer, the term of this patent is extended or adjusted under 35 U.S.C. 154(b) by 0 days.

(21) Appl. No.: 13/883,784

(22) PCT Filed: Nov. 8, 2011

(86) PCT No.: PCT/EP2011/069627
§ 371 (c)(1),
(2), (4) Date: Jun. 5, 2013

(87) PCT Pub. No.: WO2012/062741
PCT Pub. Date: May 18, 2012

(65) Prior Publication Data
US 2013/0269874 A1    Oct. 17, 2013

(30) Foreign Application Priority Data

Nov. 12, 2010 (EP) .................................... 10191040

(51) Int. Cl.
| | |
|---|---|
| B29C 65/00 | (2006.01) |
| B32B 37/00 | (2006.01) |
| B32B 38/00 | (2006.01) |
| C08G 18/00 | (2006.01) |
| C08L 75/00 | (2006.01) |
| C08G 18/08 | (2006.01) |
| C09J 131/04 | (2006.01) |
| B29C 65/02 | (2006.01) |
| C08L 75/04 | (2006.01) |
| C08L 75/06 | (2006.01) |

(Continued)

(52) U.S. Cl.
CPC ............ *C09J 131/04* (2013.01); *B29C 65/02* (2013.01); *B32B 37/04* (2013.01); *C08G 18/0823* (2013.01); *C08G 18/0828* (2013.01); *C08G 18/3275* (2013.01); *C08G 18/4216* (2013.01); *C08G 18/6655* (2013.01); *C08G 18/755* (2013.01); *C08L 75/04* (2013.01); *C08L 75/06* (2013.01); *C08L 75/12* (2013.01); *C09J 5/06* (2013.01); *C09J 175/00* (2013.01); *C09J 175/04* (2013.01); *C09J 175/06* (2013.01); *B32B 2274/00* (2013.01); *B32B 2309/02* (2013.01); *B32B 2375/00* (2013.01); *C08G 2170/20* (2013.01); *C08G 2170/80* (2013.01); *C08L 23/0853* (2013.01); *C08L 2666/04* (2013.01); *C09J 2203/10* (2013.01)

(58) Field of Classification Search
CPC .... B29C 65/02; B32B 37/04; B32B 2274/00; B32B 2309/02; B32B 2375/00; C08G 18/0823; C08G 18/0828; C08G 18/3275; C08G 18/4216; C08G 18/6655; C08G 18/755; C08G 2170/20; C08G 2170/80; C08L 23/0853; C08L 75/04; C08L 75/06; C08L 75/12; C08L 2666/04; C09J 5/06; C09J 131/04; C09J 175/00; C09J 175/04; C09J 175/06; C09J 2203/10
USPC ............... 156/283, 285, 288, 311, 312, 331.7
See application file for complete search history.

(56) References Cited

U.S. PATENT DOCUMENTS

| | | | |
|---|---|---|---|
| 3,669,729 A | * | 6/1972 | Seiner .......................... 428/314.4 |
| 4,753,708 A | | 6/1988 | Markert et al. |

(Continued)

FOREIGN PATENT DOCUMENTS

| | | |
|---|---|---|
| DE | 3321797 A1 | 12/1984 |
| EP | 0936249 A1 | 8/1999 |
| WO | WO-02/068557 A1 | 9/2002 |

OTHER PUBLICATIONS

International Preliminary Report on Patentability and Written Opinion for PCT/EP2011/069627, mailed May 23, 2013.

(Continued)

*Primary Examiner* — Patrick Niland
(74) *Attorney, Agent, or Firm* — Drinker Biddle & Reath LLP

(57) ABSTRACT

Hot-sealable coating systems and method for joining surfaces The present invention relates to a hot-sealable coating system, comprising a polyurethane and/or polyurethane-polyurea polymer (I) and an olefin vinyl acetate copolymer (II). The polyurethane and/or polyurethane-polyurea polymer (I) is obtainable by the reaction of (A) at least one diol and/or polyol component, (B) at least one di- and/or polyisocyanate component, (C) at least one component having sulphonate and/or carboxylate groups, (D) mono-, di- and/or tri-amino-functional and/or hydroxyamino-functional compounds (as appropriate), (E) other isocyanate-reactive compounds (as appropriate). The polyurethane and/or polyurethane-polyurea polymer (I) has a glass transition temperature of ≤10° C. and the olefin vinyl acetate copolymer (II) has a minimum film forming temperature (white point temperature) of >+40° C. The invention also relates to the use of the coating system and a method for joining surfaces in which the coating system according to the invention is used.

14 Claims, No Drawings

(51) Int. Cl.
*C09J 5/06* (2006.01)
*C08L 75/12* (2006.01)
*B32B 37/04* (2006.01)
*C09J 175/04* (2006.01)
*C08G 18/32* (2006.01)
*C08G 18/42* (2006.01)
*C08G 18/66* (2006.01)
*C08G 18/75* (2006.01)
*C09J 175/06* (2006.01)
*C09J 175/00* (2006.01)
*C08L 23/08* (2006.01)

(56) References Cited

U.S. PATENT DOCUMENTS

| | | | |
|---|---|---|---|
| 4,870,129 | A | 9/1989 | Henning et al. |
| 5,652,299 | A | 7/1997 | Nakajima et al. |
| 2004/0116567 | A1 | 6/2004 | Schmitt et al. |

OTHER PUBLICATIONS

International Search Report for PCT/EP2011/069627 mailed Feb. 1, 2012.

* cited by examiner

HOT-SEALABLE COATING SYSTEMS AND METHOD FOR JOINING SURFACES

RELATED APPLICATIONS

This application is a national stage application (under 35 U.S.C. §371) of PCT/EP2011/069627, filed Nov. 8, 2011, which claims benefit of European application 10191040.4, filed Nov. 12, 2010, both of which are incorporated by reference herein.

The present invention relates to a hot-sealable coating system, comprising a polyurethane and/or polyurethane-polyurea polymer and an olefin vinyl acetate copolymer. The invention also relates to the use of the coating system and a method for joining surfaces in which the coating system according to the invention is used.

Hot sealing compositions for the bonding or sealing of foodstuff containers, such as sealing a yoghurt cup with an aluminum lid, are known in the art. In general these compositions are solvent-borne. Suitable polymers are polyolefins in combination with methacrylate polymers, for example as mentioned in WO 02/068557 A1. This patent application discloses a hot sealing system comprised of an olefin or of an olefin copolymer A, of a methacrylate polymer B, of a graft polymer A-X consisting of these constituents and of a solvent or a solvent mixture. This hot sealing system is said to have a high thermal stability and short sealing times.

Another example for solvent-borne systems is given in DE 33 21 797 A1 which discusses a film-forming dispersion for the heat-sealing of dissimilar substrates. Said dispersion comprises at least two different types of polymers having different adhesive properties in an organic solvent system. At least one of the polymers is fully miscible at room temperature with the organic solvent system. Both of said two polymer types have an acid number ranging from 0 to 160 mg KOH per gram of polymer. Said dispersion further contains a third graft polymer containing components corresponding to said two different polymer types.

Another aspect of hot sealing foodstuff containers is that the frequently used polyolefin container materials have low surface energies. This usually necessitates a pre-treatment by methods such as corona treatment in order to ensure a good bond of the adhesive to the polyolefin surface. It can be readily envisaged that these additional steps increase the overall process time and costs.

Due to environmental and health concerns a need exists in the art for hot sealing compositions that are not based on organic solvents. Furthermore, hot sealing compositions would be desirable that can be used on untreated polyolefin surfaces. The present invention therefore has the object of providing such compositions which may be applied in a water-borne or solid form.

According to the invention this object is achieved by a hot-sealable coating system, comprising:
(I) a polyurethane and/or polyurethane-polyurea polymer which is obtainable by the reaction of:
  (A) at least one diol and/or polyol component,
  (B) at least one di- and/or polyisocyanate component,
  (C) at least one component having sulphonate and/or carboxylate groups,
  (D) mono-, di- and/or tri-amino-functional and/or hydroxyamino-functional compounds, as appropriate,
  (E) other isocyanate-reactive compounds, as appropriate; and
(II) an olefin vinyl acetate copolymer,
wherein the polyurethane and/or polyurethane-polyurea polymer (I) has a glass transition temperature of ≤10° C.;
the glass transition temperature being determined by differential scanning calorimetry according to DIN 65467 at a heating rate of 20 K/min;
and
wherein the olefin vinyl acetate copolymer (II) has a minimum film forming temperature (white point temperature) of >+40° C.;
the film forming temperature (white point temperature) being determined by differential scanning calorimetry according to DIN 2115 at a heating rate of 20 K/min.

It has been found that the systems according to the invention can be applied as aqueous dispersions and can form films at temperatures as low as room temperature. Composite strengths when used as adhesives for untreated polyolefin surfaces with their low surface energies are surprisingly high, even at sealing temperatures such as 70° C. or higher.

With respect to the polyurethane and/or polyurethane-polyurea polymer (I), suitable diol and/or polyol components (A) are compounds with at least two hydrogen atoms being reactive with isocyanates and having an average molecular weight of 62 to 18,000, preferably 62 to 4,000 g/mol. Examples of suitable structural components are polyethers, polyesters, polycarbonates, polyacetones and polyamides. Preferred polyols (A) have 2 to 4, more preferably 2 to 3 hydroxyl groups, most preferably 2 hydroxyl groups. Mixtures of different compounds of this type are also conceivable.

Possible polyester polyols include in particular linear polyester diols and slightly branched polyester polyols such as may be prepared in a known manner from aliphatic, cycloaliphatic or aromatic di- or polycarboxylic acids such as succinic, methyl succinic, glutaric, adipic, pimelic, suberic, azelaic, sebacic, nonane dicarboxylic, decane dicarboxylic, terephthalic, isophthalic, o-phthalic, tetrahydrophthalic, hexahydrophthalic, cyclohexane-dicarboxylic, maleic, fumaric, malonic or trimellitic acid as well as acid anhydrides such as o-phthalic, trimellitic or succinic acid anhydride or mixtures thereof with polyhydric alcohols such as ethanediol, di-, tri-, tetraethylene glycol, 1,2-propanediol, di-, tri-, tetrapropylene glycol, 1,3-propanediol, butanediol-1,4, butanediol-1,3, butanediol-2,3, pentanediol-1,5, hexanediol-1,6, 2,2-dimethyl-1,3-propanediol, 1,4-dihydroxycyclohexane, 1,4-dimethylolcyclohexane, octanediol-1,8, decanediol-1, 10, dodecanediol-1,12 or mixtures thereof, also using higher functional polyols such as trimethylolpropane, glycerine or pentaerythrite, where appropriate. Of course, cycloaliphatic and/or aromatic di- and polyhydroxyl compounds are also conceivable for the manufacture of the polyester polyols. Instead of the free polycarboxylic acid, the corresponding polycarboxylic acid anhydrides or corresponding polycarboxylic acid esters of low-order alcohols or mixtures thereof may also be used for the manufacture of the polyesters.

Of course, the polyester polyols may be homo- or copolymers of lactones which preferably are obtained by addition of lactones or lactone mixtures such as butyrolactone, ε-caprolactone and/or methyl-ε-caprolactone to suitable di- or higher functional starter molecules such as the low-molecular, polyhydric alcohols mentioned above as the structural components for polyester polyols. The corresponding polymers of ε-caprolactone are preferred.

Particularly preferred are polyester polyols containing isophthalic acid and/or terephthalic acid and other dicarboxylic acids as well as 2,2-dimethyl-1,3-propanediol and/or ethyleneglycol and/or butanediol and/or hexanediol, where appropriate, as structural components.

Most particularly preferred are polyester polyols containing isophthalic acid, adipic acid and 2,2-dimethyl-1,3-propanediol as structural components.

Polycarbonates having hydroxyl groups are also possible polyhydroxyl components (A), for instance of the type which may be prepared by reaction of diols such as 1,4-butanediol and/or 1,6-hexanediol with diarylcarbonates such as diphenylcarbonate, dialkylcarbonates such as dimethylcarbonate or phosgene. The resistance to hydrolysis of the polyurethane or polyurethane-urea dispersion adhesives may be improved by at least in part using polycarbonates having hydroxyl groups.

Suitable polyether polyols are, for instance, the polyaddition products of the styrene oxides, ethylene oxide, propylene oxide, tetrahydrofurane, butylene oxide, epichlorohydrin as well as their coaddition and grafting products as well as the polyether polyols obtained by condensation of polyhydric alcohols or mixtures thereof and by alcoxylation of polyhydric alcohols, amines and aminoalcohols. The homo-, co- and graft polymers of propylene oxide and of ethylene oxide which are available by addition of the mentioned epoxides to low-molecular di- or triols, mentioned above as the structural components for polyether polyols, or to higher functional low-molecular polyols such as pentaerythrite or sugars or to water are suitable polyether polyols as the structural components (A).

Particularly preferred di- or higher functional polyols (A) are polyester polyols, polylactones and polycarbonates.

Other suitable components (A) are low-molecular diols, triols and/or tetraols such as ethanediol, di-, tri-, tetraethyleneglycol, 1,2-propanediol, di-, tri-, tetrapropyleneglycol, 1,3-propanediol, butanediol-1,4, butanediol 1,3, butanediol-2,3, pentanediol-1,5, hexanediol-1,6, 2,2-dimethyl-1,3-propanediol, 1,4-dihydroxycyclohexane, 1,4-dimethylolcyclohexane, octanediol-1,8, decanediol-1,10, dodecanediol-1,12, neopentylglycol, 1,4-cyclohexanediol, 1,4-cyclohexanedimethanol, 1,4-, 1,3-, 1,2-dihydroxybenzene or 2,2-bis-(4-hydroxyphenyl)-propane (bisphenol (A), TCD-diol, trimethylolpropane, glycerine, pentaerythrite, dipenthaerytrite or mixtures thereof, if appropriate, using further diols or triols not mentioned.

Reaction products of the mentioned polyols, particularly of the low-molecular polyols, with ethylene and/or propylene oxide also may be employed as the polyols.

The low-molecular components (A) have a molecular weight of 62 to 400 g/mol and are preferably employed in combination with the polyester polyols, polylactones, polyethers and/or polycarbonates mentioned above.

The polyol component (A) is contained in the polyurethane according to the invention at 20 to 95, preferably at 30 to 90 and more preferably at 65 to 88% by weight.

As components (B) any organic compounds are suited which contain at least two free isocyanate groups per molecule. Preferably, diisocyanates $Y(NCO)_2$ are used, wherein Y represents a divalent aliphatic hydrocarbon radical having 4 to 12 carbon atoms, a divalent cycloaliphatic hydrocarbon radical having 6 to 15 carbon atoms, a divalent aromatic hydrocarbon radical having 6 to 15 carbon atoms, or a divalent araliphatic hydrocarbon radical having 7 to 15 carbon atoms. Examples of such preferably used diisocyanates are tetramethylene diisocyanate, methylpentamethylene diisocyanate, hexamethylene diisocyanate, dodecamethylene diisocyanate, 1,4-diisocyanato-cyclohexane, 1-isocyanato-3,3,5-trimethyl-5-isocyanatomethyl-cyclohexane (=IPDI, isophorone diisocyanate), 4,4'-diisocyanato-dicyclohexylmethane, 4,4'-diisocyanato-dicyclohexylpropane-(2,2), 1,4-diisocyanatobenzene, 2,4-diisocyanatotoluene, 2,6-diisocyanatotoluene, 4,4'-diisocyanato-diphenylmethane, 2,2'- and 2,4'-diisocyanatodiphenylmethane, tetramethylxylylene diisocyanate, p-xylylene diisocyanate, p-isopropylidene diisocyanate as well as mixtures consisting of these compounds.

Of course, it is also possible to use in part the higher functional polyisocyanates known per se in polyurethane chemistry or modified polyisocyanates known per se such as those having carbodiimide groups, allophanate groups, isocyanurate groups, urethane groups and/or biuret groups.

In addition to these simple diisocyanates, those polyisocyanate are also suited which contain heteroatoms in the radical linking the isocyanate groups and/or have a functionality of more than 2 isocyanate groups per molecule. The first ones, for instance, are polyisocyanates prepared by the modification of simple aliphatic, cycloaliphatic, araliphatic and/or aromatic diisocyanates with a uretdione, isocyanurate, urethane, allophanate, biuret, carbodiimide, imino-oxadiazin dione and/or oxadiazin trione structure. One example of a non modified polyisocyanate with more than 2 isocyanate groups per molecule is 4-isocyanatomethyl-1,8-octanediisocyanate (nonanetriisocyanate), for example.

Preferred diisocyanates (B) are aliphatic such as hexamethylene diisocyanate, 1,4-diisocyanatocyclohexane, 1-isocyanato-3,3,5-trimethyl-5-isocyanatomethyl-cyclohexane, 4,4'-diisocyanato-dicyclohexyl-methane and 4,4'-diisocyanato-dicyclohexylpropane-(2,2), as well as mixtures consisting of these compounds.

Particularly preferred components (B) are hexamethylene diisocyanate, 1-isocyanato-3,3,5-trimethyl-5-isocyanatomethyl-cyclohexane and 4,4'-diisocyanato-dicyclohexyl-methane, as well as mixtures thereof.

The component (B) is contained in the polyurethane according to the invention in quantities of 5 to 60, preferably of 6 to 45, and more preferably in quantities of 7 to 25% by weight.

Suitable components (C) which contain sulphonate or carboxylate groups are, for instance, diamino compounds or dihydroxy compounds which additionally carry sulphonate and/or carboxylate groups such as the sodium, lithium, potassium, tert.-amine salts of N-(2-aminoethyl)-2-aminoethane sulphonic acid, N-(3-aminopropyl)-2-aminoethane sulphonic acid, N-(3-aminoproyl)-3-aminopropane sulphonic acid, N-(2-aminoethyl)-3-aminopropane sulphonic acid, the analogous carboxyl acids, dimethylol propionic acid, dimethylol butyric acid, the reaction products in the sense of a Michael condensation of 1 Mol diamine such as 1,2-ethane diamine or isophorone diamine with 2 mol acrylic acid or maleic acid.

Preferably, the acids are employed directly in their salt form as sulphonate or carboxylate. However, it is also possible to add the neutralizing agents partly or completely during or after the manufacture of the polyurethanes only.

Tert.-amines particularly suitable and preferred for the salt formation are triethylamine, dimethylcyclohexylamine, ethyldiisopropylamine, for example.

Other amines such as ammonia, diethanolamine, triethanolamine, dimethylethanolamine, methydiethanolamine, aminomethylpropanol and also mixtures of the aforementioned and also further amines may also be employed for the salt formation. It is expedient for these amines to be added only after substantial reaction of the isocyanate groups.

It is also possible to employ other neutralizing agents such as sodium, potassium, lithium, calcium hydroxide for neutralizing purposes.

The component (C) is contained in the polyurethane according to the invention at 0.3 to 10, preferably at 0.5 to 5 and more preferably at 0.7 to 3.75% by weight.

Suitable components (D) are mono-, di-, trifunctional amines and/or mono-, di-, trifunctional hydroxyamines such as aliphatic and/or alicyclic primary and/or secondary monoamines such as ethylamine, diethylamine, the isomer propyl and butylamines, higher linearly aliphatic monoamines and cycloaliphatic monoamines such as cyclohexylamine. Further examples are aminoalcohols, i.e. compounds which contain amino and hydroxyl groups in one molecule such as ethanolamine, N-methylethanolamine, diethanolamine, diisopropanolamine, 1,3-diamino-2-propanol, N-(2-hydroxyethyl)-ethylenediamine, N,N-bis(2-hydroxyethyl)-ethylenediamine and 2-propanolamine. Further examples are diamines and triamines such as 1,2-ethanediamine, 1,6-hexamethylenediamine, 1-amino-3,3,5-trimethyl-5-aminomethyl-cyclohexane (isophoronediamine), piperazine, 1,4-diaminocyclohexane, bis-(4-aminocyclohexyl)-methane and diethylenetriamine. Furthermore, adipic acid dihydrazide, hydrazine or hydrazine hydrate is conceivable. Of course, mixtures of a plurality of the aforementioned compounds (D), optionally also together with ones not mentioned, may be employed.

Preferred components (D) are 1,2-ethanediamine, 1-amino-3,3,5-trimethyl-5-aminomethyl-cyclohexane, diethylenetriamine, diethanolamine, ethanolamine, N-(2-hydroxyethyl)-ethylenediamine and N,N-bis(2-hydroxyethyl)-ethylenediamine.

Particularly preferred components (D) are diethanolamine and N-(2-hydroxyethyl)-ethylenediamine; diethanolamine is more particularly preferred.

The components (D) as chain extension agents preferably serve to build up higher molecular weights or to limit molecular weights as monofunctional compounds and/or to additionally insert further reactive groups such as free hydroxyl groups as further cross linking positions, where appropriate.

The component (D) is contained in the polyurethane according to the invention in quantities of 0 to 10, preferably of 0 to 5 and more preferably in quantities of 0.2 to 3% by weight.

Components (E) which are optionally also used may for example be aliphatic, cycloaliphatic or aromatic monoalcohols with 2 to 22 C atoms such as ethanol, butanol, hexanol, cyclohexanol, isobutanol, benzyl alcohol, stearyl alcohol, 2-ethylethanol, cyclohexanol; hydrophilizingly acting, mono- or difunctional polyethers on the basis of ethylene oxide polymers or ethylene oxide/propylene oxide copolymers started on alcohols or amines such as polyether LB 25 (Bayer Material Science AG; Germany) or MPEG 750: methoxypolyethylene glycol, molecular weight 750 g/mol (e.g., Pluriol® 750, BASF AG, Germany); blocking agents common for isocyanate groups and re-separable at elevated temperatures such as butanonoxime, dimethylpyrazole, caprolactam, malonic acid ester, triazole, dimethyltriazole, tert.-butylbenzylamine, cyclopentanone carboxyethylester; unsaturated compounds containing groups accessible for polymerisation reactions such as hydroxyethyl acrylate, hydroxyethyl methacrylate, hydroxybutyl acrylate, hydroxybutyl methacrylate, hydroxypropyl acrylate, hydroxypropyl methacrylate, pentaerythrite trisacrylate, hydroxyfunctional reaction products of monoepoxides, bisepoxides and/or polyepoxides with acrylic acid or methacrylic acid.

The components (E) may be contained in the polyurethane according to the invention in quantities of 0 to 20, preferably of 0 to 10% by weight.

The use of component (E) may for example lead to polyurethane dispersions according to the invention which in addition to the reactive carboxyl groups contain further reactive groups enabling, for example, the application of various cross-linking mechanisms (Dual Cure) in order to obtain special properties such as a two-stage curing, optionally temporally offset, or a particularly high cross-linking density.

In a particularly preferred embodiment, this polyurethane and/or polyurethane-polyurea polymer contains a polyester diol which contains isophthalic acid, adipic acid and 2,2-dimethyl-1,3-propanediol as structural components, 1-isocyanato-3,3,5-trimethyl-5-isocyanatomethyl-cyclohexane, the sodium salt of N-(2-aminoethyl)-2-aminoethane sulphonic acid and diethanolamines as structural components.

These aqueous polyurethane and/or polyurethane-urea dispersions may be prepared in such a manner that the components (A), (B), optionally (C), and optionally (E) are transformed in a single- or multi-stage reaction into an isocyanate-functional prepolymer which subsequently, in a single- or multi-stage reaction, is transformed optionally with component (C) and optionally (D), and then is dispersed in or with water, wherein the solvent used, if any, may be removed partly or completely by distillation during or after the dispersion.

The preparation may be performed in one or more stages in homogeneous or, in the case of a multi-stage reaction, partly in disperse phase. After the completely or partly performed polyaddition a dispersing, emulsifying or dissolving step is carried out. Subsequently, a further polyaddition or modification is optionally carried out in disperse phase. All methods known in the prior art such as emulsifier-shear force, acetone, prepolymer-mixing, melt-emulsifying, ketimine and solid-matter spontaneous dispersing methods or derivatives thereof may be used for the manufacture. A summary of these methods is to be found in Methoden der organischen Chemie (Methods of Organic Chemistry) (Houben-Weyl, extension and continuation volumes to the $4^{th}$ edition, volume E20, H. Bard and J. Falbe, Stuttgart, N.Y., Thieme 1987, pp. 1671-1682). The melt-emulsifying, prepolymer-mixing and acetone methods are preferred. The acetone method is particularly preferred.

In principle, it is possible to weigh in all hydroxyl-functional components, then to add all isocyanate-functional components and to transform this into isocyanate-functional polyurethane which then will be reacted with the amino-functional components. A reverse manufacture by filling in the isocyanate component first, adding the hydroxyl-functional components, transforming into polyurethane and then reacting with the amino-functional components to form the final product is also possible.

Conventionally, for the manufacture of a polyurethane polymer in the reactor the hydroxyl-functional components (A), optionally (C), and optionally (E) are filled in first, optionally diluted with a solvent which is mixable with water but inert to isocyanate groups, and then homogenized. Subsequently, at room temperature up to 120° C., the component (B) is added and isocyanate-functional polyurethane is manufactured. This reaction may be carried out in a single stage or in a plurality of stages. A multi-stage reaction, for instance, may occur such that a component (C) and/or (E) is filled in first and after the reaction with the isocyanate-functional component (B) a component (A) is added which then may react with part of the still existing isocyanate groups.

Suitable solvents are for example acetone, methylisobutylketone, butanone, tetrahydrofurane, dioxane, acetonitrile, dipropylene glycol dimethyl ether and 1-methyl-2-pyrrolidone, which may be added not only at the beginning of the manufacture but optionally also in part later. Acetone and butanone are preferred. It is possible to perform the reaction at normal pressure or elevated pressure.

For the manufacture of the prepolymer the used quantities of the hydroxyl- and, where appropriate, amino-functional components are selected such as to result in an isocyanate index of 1.05 to 2.5, preferably of 1.15 to 1.95, more preferably of 1.3 to 1.7.

The further transformation, the so-called chain extension, of the isocyanate-functional prepolymer with further hydroxyl- and/or amino-functional, preferably only amino-functional components (D) and optionally (C) is effected such that a transformation degree of 25 to 150, preferably of 40 to 85% of hydroxyl and/or amino groups, based on 100% of isocyanate groups, is selected.

With transformation degrees of more than 100%, which are possible but less preferred, it is advisable to react all monofunctional components in the sense of the isocyanate addition reaction with the prepolymer first and subsequently to employ the di- or higher functional chain extension components, in order to obtain as complete an integration of the chain extension molecules as possible.

The transformation degree is conventionally monitored by tracking the NCO content of the reaction mixture. Additionally, spectroscopic measurements, e.g. infrared or near-infrared spectra, determinations of the refractive index as well as chemical analyses such as titrations of samples taken may be carried out.

For the acceleration of the isocyanate addition reaction, conventional catalysts such as are known by those skilled in the art for the acceleration of the NCO—OH reaction may be employed. Examples are triethylamine, 1,4-diazabicyclo-[2,2,2]-octane, dibutyl tin oxide, tin dioctoate or dibutyl tin dilaurate, tin-bis-(2-ethylhexanoate) or other metallo-organic compounds.

The chain extension of the isocyanate-functional prepolymer with the component (D) and optionally (C) may be performed before the dispersion, during the dispersion or after the dispersion. The chain extension is preferably performed before the dispersion. If component (C) is employed as a chain extension component then a chain extension with this component before the dispersion step is mandatory.

The chain extension is conventionally performed at temperatures of 10 to 100° C., preferably of 25 to 60° C.

The term chain extension in the sense of the present invention also involves the reactions of monofunctional components (D), if any, which due to their monofunctionality act as chain terminators and thus do not lead to an increase but to a limitation of the molecular weight.

The components of the chain extension may be added to the reaction mixture diluted with organic solvents and/or with water. The addition may be effected successively in any order or simultaneously by adding a mixture.

For the purposes of manufacturing the dispersion, the prepolymer is charged into the dispersing water or conversely the dispersing water is stirred into the prepolymers, with strong shearing action such as strong agitation. Subsequently, the chain extension may then be carried out if it has not already taken place in the homogeneous phase.

During and/or after dispersing, the organic solvent used, if any, such as acetone is distilled off.

The following is a preferred manufacturing method:
Component (A), optionally component (C), and optionally component (E), and optionally solvents, are filled in first and heated up to 20 to 100° C. While stirring, component (B) is added as fast as possible. Exploiting the exothermy, the reaction mixture is stirred at 40 to 150° C. until the theoretical isocyanate content is achieved or slightly fallen below. While doing so, a catalyst may optionally be added. Subsequently, the mixture is diluted to a solid matter content of 25 to 95, preferably of 35 to 80% by weight by adding solvent; and then the chain extension is performed by adding the component (E) diluted with water and/or solvent, optionally together with component (C), at 30 to 120° C. After a reaction period of 2 to 60 minutes, it is dispersed by adding distilled water or by transferring into distilled water filled in first and the solvent used is partly or completely distilled off during or after the dispersing step.

The polyurethane and/or polyurethane-polyurea polymer (I) may have a weight-average molecular weight of $\geq 30000$ g/mol to $\leq 40000$ g/mol. Preferred weight-average molecular weights are $\geq 33000$ g/mol to $\leq 36000$ g/mol. The weight average molecular weights $M_w$ may be determined by GPC (Gel Permeation Chromatography) with dimethylacetamide as a mobile phase against a polystyrene standard.

The present invention will be further described in connection with exemplary embodiments. The embodiments may as well be combined freely unless the context clearly indicates the contrary.

In a first embodiment of the coating system according to the invention the polyol component (A) is a linear polyester polyol. Particularly preferred are such polyols based on adipic acid, isophthalic acid, neopentyl glycol and ethylene glycol. They may have a hydroxyl number of 55±5 mg KOH/g (DIN 53240/2) and a weight average molecular weight of 2000 g/mol.

In another embodiment of the coating system according to the invention the polyisocyanate component (B) is isophorone diisocyanate (IPDI).

In another embodiment of the coating system according to the invention the component (C) is N-(2-aminoethyl)-2-aminoethane sulphonic acid and the component (D) is diethanol amine.

In another embodiment of the coating system according to the invention the olefin vinyl acetate copolymer (II) is ethylene vinyl acetate copolymer. Particularly preferred are those copolymers where the formed resin formed from them has a tensile strength of $\geq 2.5$ MPa to $\leq 3.5$ MPa (JIS K-6760) and an elongation at break of $\geq 250\%$ to $\leq 350\%$ (JIS K-6760).

In another embodiment of the coating system according to the invention the polyurethane and/or polyurethane-polyurea polymer (I) has a glass transition temperature $\geq -50°$ C. to $\leq 10°$ C., the glass transition temperature being determined by differential scanning calorimetry according to DIN 65467 at a heating rate of 20 K/min.

In another embodiment of the coating system according to the invention the olefin vinyl acetate copolymer (II) has a minimum film forming temperature (white point temperature) of $\geq +40°$ C. to $\leq 90°$ C., the film forming temperature being determined according to DIN ISO 2115. More preferably, the minimum film forming temperature (white point temperature) is in a range of $\geq +50°$ C. to $\leq 80°$ C.

In another embodiment of the coating system according to the invention the polymer formed by combining the polyurethane and/or polyurethane-polyurea polymer (I) and the olefin vinyl acetate copolymer (II) has a storage modulus G' at 50° C. and 1 rad/s of between $1*10^5$ Pa and $1*10^8$ Pa, preferably of between $1*10^4$ Pa and $1*10^7$ Pa; the storage modulus being determined by means of oscillating rheometry in accordance with ASTM D 4440-08.

The storage (and loss) modulus may be determined by means of oscillating rheometry in accordance with ASTM D 4440-08 with a Rheometrics ARES rotational rheometer. With this measuring principle the upper and the lower measuring plate are brought together beforehand in order to calibrate the position of the measuring plates at a gap distance equal to zero. A circular sample, with the same diameter as the measuring plate diameter is punched out of the dried dispersion. The sample is applied between the measuring plates; the measuring plates are brought together up to the sample height and tempered for 10 minutes. Subsequently, the plate distance is reduced such that a normal force of 10 N maximum and 2 N minimum results. Material possibly protruding beyond the measuring plates is removed with a blade. The oscillating measurement is initiated at 100 rad/s. Subsequently, the measurement frequency is reduced in steps of 3 measurements every ten days up to 0.01 rad/s. The deformation of the oscillation has an edge amplitude of 0.6% to 2%. For the measurement at a constant measurement temperature, the device's software calculates the storage and the loss modulus for each measurement frequency from the torque, the phase difference between tension and deformation and the plate geometry.

In another embodiment of the coating system according to the invention the weight ratio of the polyurethane and/or polyurethane-polyurea polymer (I) and the olefin vinyl acetate copolymer (II) is ≥10:90 to ≤60:40. Preferably, the weight ratio is in the range of ≥20:80 to ≤50:50.

In another embodiment of the coating system according to the invention the coating system is present in the form of an aqueous dispersion. It is preferred that the aqueous dispersion or dispersions contain less than 0.5% by weight of organic solvents. The dispersions may have a solid matter content of ≥15 to ≤70% by weight, more preferably of ≥25 to ≤60% by weight and most preferably of ≥30 to ≤50% by weight. The solid matter content may be determined in accordance with DIN-EN ISO 3251. The pH-value may be in the range from ≥4 to ≤11, preferably from ≥6 to ≤10.

The coating system according to the invention can be prepared by adding an olefin vinyl acetate copolymer to an aqueous dispersion of a polyurethane and/or polyurethane-polyurea polymer. Preferably, an aqueous dispersion of polyurethane and/or polyurethane-polyurea polymer is stirred while an olefin vinyl acetate copolymer in form or a solid powder is added.

The hot-sealable composition according to the invention may be used for joining surfaces. In particular, it may be used for joining untreated polypropylene with aluminum surfaces, PET surfaces or surfaces made of cardboard and plastic, in particular Mixpap® surfaces. The polyolefin surfaces, preferably polypropylene surfaces, may be untreated prior to joining. It is especially preferred that these surfaces have not been modified by plasma discharge or corona treatment. The surfaces may have a low surface energy such as critical surface energy $\sigma_c$, determined according to DIN 55 660-2, of ≤40 mN/m. Preferably the critical surface energy is ≤35 mN/m.

Another aspect of the present invention is therefore a method for joining surfaces, the method comprising the steps of:
providing a first surface and a second surface;
at least partially applying a composition according to the present invention to the first and/or second surface;
contacting the first surface with the second surface so that the composition according to the present invention is located between the first and the second surface to give a layered assembly;
heating the layered assembly to a temperature of ≥50° C. and simultaneously applying a pressure of ≥1 bar to the layered assembly.

Examples for first and second surfaces are metal and polymer surfaces.

Preferably the method comprises the steps of:
providing a first surface and a second surface;
at least partially applying a composition according to the present invention to the first surface;
contacting the first surface with the second surface so that the composition according to the present invention is located between the first and the second surface to give a layered assembly;
heating the layered assembly to a temperature of ≥50° C. and simultaneously applying a pressure of ≥1 bar to the layered assembly,
whereby the first surface is an aluminum surface, PET surface or a surface made of cardboard and plastic, in particular a Mixpap® surface, and the second surface is a polyolefin surface.

The composition according to the invention may be applied by known methods such as painting, spraying, doctor blading, screen printing, intaglio printing, flexo printing and the like. In case of liquid-borne compositions the wet film thickness may be in a range of ≥2 μm to ≤50 μm.

Following this, the first and second surfaces are joined so that the composition according to the invention is between the surfaces.

The heating and pressure step then leads to the final assembly with surfaces adhering to each other by means of the hot-sealable composition according to the invention. Preferred pressures are ≥1 bar to ≤5 bar.

Regarding additional details, in particular with respect to the heat-sealable composition, reference is made to the preceding description in the interest of avoiding repetitions.

In a first embodiment of the method according to the invention the first surface is an aluminum surface or polyethylene terephthalate surface or a surface made of cardboard and plastic, in particular a Mixpap® surface, and the second surface is a polyolefin surface. Preferred polyolefin surfaces are polyethylene and polypropylene surfaces including mixtures of polyethylene and polypropylene. It is especially preferred that these surfaces have not been modified by plasma discharge or corona treatment prior to being subjected to the method according to the invention.

In another embodiment of the method according to the invention the first surface and/or the second surface have a critical surface energy $\sigma_c$, determined according to DIN 55 660-2, of ≤40 mN/m. Preferably the critical surface energy is ≤30 mN/m. These low surface energies reflect surfaces which are usually not accessible for adhering via polymer dispersion adhesives. In the method according to the invention this has become possible.

In another embodiment of the method according to the invention the composition according to the present invention is applied in the form of an aqueous dispersion and dried at a temperature of ≥20° C. to ≤120° C., preferably at a temperature of ≥20° C. to ≤70° C., prior to the next step. The drying temperature is generally selected depending on the kind of material of the first and/or second surface. This means that the drying can be performed at room temperature without the need for extra heating facilities.

In another embodiment of the method according to the invention, in the step of heating the layered assembly the layered assembly is heated to a temperature of ≥70° C. to ≤220° C. Preferably the temperature is ≥70° C. to ≤140° C.

The present invention will be further described with reference to the following examples without wishing to be limited by them.

Glossary:

Baycoll® AD 2047: linear polyester polyol based on adipic acid, isophthalic acid, neopentyl glycol and ethylene glycol with a hydroxyl number of 55±5 mg KOH/g (DIN 53240/2) and a molecular weight of 2000 g/mol, Bayer MaterialScience Desmodur® I: isophorone diisocyanate (IPDI), Bayer MaterialScience Chemipearl® V 300: aqueous ethylene vinyl acetate copolymer dispersion from Mitsui Chemicals with a solid content of 40 weight-%, a particle size of 6 µm (coulter counter method), a lowest film forming temperature of 75° C. according to DIN ISO 2115 measured at a heating rate of 20 K/min. The formed resin has a tensile strength of 3 MPa (JIS K-6760) and an elongation at break of 300% (JIS K-6760).

Synthesis of the Polyurethane/Polyurethane-Polyurea Dispersion PUR-1:

486.25 g of Baycoll® AD 2047 polyester were dehydrated for 1 hour at 100° C. and 15 mbar. At 60° C. 80.52 g of Desmodur® I were added. The mixture was agitated at 90° C. until an isocyanate content of 1.80 was reached. The reaction mixture was dissolved in 850 g acetone and in doing so cooled down to 50° C. A solution of 9.62 g sodium salt of N-(2-aminoethyl)-2-aminoethane sulphonic acid and 8.20 g diethanol amine in 170 g of water was added to the homogenous solution with strong stirring. After 30 minutes of stirring, the mixture was dispersed at 50° C. within 20 minutes by adding 715 g of water. After the separation of the acetone by distillation, a solvent-free, aqueous polyurethane-polyurea dispersion with a solid matter content of 40.1% by weight, an average particle size of the disperse phase of 250 nm and a pH of 6.7 was obtained. The glass transition temperature $T_g$ was +2° C. (according to DIN 65467 at a heating rate of 20 K/min) and the weight average molecular weight $M_w$ was 35500 g/mol (as determined by GPC with dimethylacetamide as a mobile phase against a polystyrene standard).

Using PUR-1 and Chemipearl® V 300, the following formulations were prepared:

| Formulation | Weight-% PUR-1 | Weight-% Chemipearl ® V 300 |
|---|---|---|
| F-0 (comparative) | 0 | 100 |
| F-1 | 20 | 80 |
| F-2 | 30 | 70 |
| F-3 | 40 | 60 |
| F-4 | 50 | 50 |

The formulations F-0 to F-4 were applied to polyethylene terephthalate (PET) films or aluminum (Al) foils with a wet film thickness of 100 µm and the coated substrates were dried at 23° C., 70° C., 100° C. or 120° C. Using a hot sealing apparatus manufactured by Brugger (sealing apparatus, type Munich HSG/ETK) these coated substrates were then sealed against polypropylene (PP) films within 1 second at a pressure of 2 bar and at a temperature of 100° C., 120° C. or 140° C. The PP was untreated with a critical surface energy $\sigma_c$ of less than 30 mN/m as determined by DIN 55 660-2.

The seal strength [N/15 mm] of the laminates was determined in a T-peeling experiment at 100 mm/min according to DIN 53357 and is given in the following tables.

TABLE 1

Seal strength [N/15 mm]

| Formulation | Substrates | Drying temp. | Sealing temp. 100° C. | Sealing temp. 120° C. | Sealing temp. 140° C. |
|---|---|---|---|---|---|
| F-0 | PET/PP | 23° C. | | No film formation | |
| F-1 | PET/PP | 23° C. | 0.7 | 4.3 | 3.9 |
| F-2 | PET/PP | 23° C. | 2.9 | 3.9 | 3.3 |
| F-3 | PET/PP | 23° C. | 2.0 | 3.1 | 3.7 |
| F-4 | PET/PP | 23° C. | 1.8 | 2.0 | 3.8 |

TABLE 2

Seal strength [N/15 mm]

| Formulation | Substrates | Drying temp. | Sealing temp. 100° C. | Sealing temp. 120° C. | Sealing temp. 140° C. |
|---|---|---|---|---|---|
| F-0 | PET/PP | 100° C. | 1.4 | 3.5 | 3.2 |
| F-1 | PET/PP | 100° C. | 2.3 | 4.9 | 4.2 |
| F-2 | PET/PP | 100° C. | 3.1 | 4.1 | 4.0 |
| F-3 | PET/PP | 100° C. | 2.8 | 3.9 | 4.9 |
| F-4 | PET/PP | 100° C. | 0.3 | 2.0 | 4.2 |

TABLE 3

Seal strength [N/15 mm]

| Formulation | Substrates | Drying temp. | Sealing temp. 100° C. | Sealing temp. 120° C. | Sealing temp. 140° C. |
|---|---|---|---|---|---|
| F-0 | Al/PP | 70° C. | 2.0 | 3.4 | 3.6 |
| F-1 | Al/PP | 70° C. | 3.3 | 2.6 | 3.1 |
| F-2 | Al/PP | 70° C. | 1.6 | 2.6 | 2.8 |
| F-3 | Al/PP | 70° C. | 1.4 | 2.7 | 2.7 |
| F-4 | Al/PP | 70° C. | 1.2 | 3.8 | 3.3 |

TABLE 4

Seal strength [N/15 mm]

| Formulation | Substrates | Drying temp. | Sealing temp. 100° C. | Sealing temp. 120° C. | Sealing temp. 140° C. |
|---|---|---|---|---|---|
| F-0 | Al/PP | 100° C. | 1.5 | 3.6 | 3.6 |
| F-1 | Al/PP | 100° C. | 4.2 | 3.2 | 2.9 |
| F-2 | Al/PP | 100° C. | 3.3 | 3.0 | 2.1 |
| F-3 | Al/PP | 100° C. | 1.4 | 2.6 | 2.8 |
| F-4 | Al/PP | 100° C. | 1.5 | 4.1 | 2.1 |

TABLE 5

Seal strength [N/15 mm]

| Formulation | Substrates | Drying temp. | Sealing temp. 100° C. | Sealing temp. 120° C. | Sealing temp. 140° C. |
|---|---|---|---|---|---|
| F-0 | Al/PP | 120° C. | 1.1 | 3.5 | 4.5 |
| F-1 | Al/PP | 120° C. | 3.4 | 3.2 | 2.8 |
| F-2 | Al/PP | 120° C. | 4.2 | 3.6 | 2.6 |
| F-3 | Al/PP | 120° C. | 3.0 | 3.8 | 3.3 |
| F-4 | Al/PP | 120° C. | 4.4 | 4.8 | 2.9 |

The examples show that the polymer of the polyolefinic dispersion does not form a film at low drying temperatures. Together with the polyurethane/polyurethane-polyurea dispersion a homogenous adhesive film is formed even at 23° C.

The laminate strengths to the untreated polypropylene film are surprisingly high.

The invention claimed is:

1. A hot-sealable coating composition, comprising:
   (I) a polyurethane and/or polyurethane-polyurea polymer which is obtained by the reaction of:
   (A) at least one diol and/or polyol component,
   (B) at least one di- and/or polyisocyanate component,
   (C) at least one component comprising sulphonate and/or carboxylate groups,
   (D) optionally mono-, di- and/or tri-amino-functional and/or hydroxyamino-functional compounds,
   (E) optionally other isocyanate-reactive compounds; and
   (II) an olefin vinyl acetate copolymer,
   wherein the polyurethane and/or polyurethane-polyurea polymer (I) has a glass transition temperature of ≤10° C.;
   the glass transition temperature being determined by differential scanning calorimetry according to DIN 65467 at a heating rate of 20 K/min;
   and
   wherein the olefin vinyl acetate copolymer (II) has a minimum film forming temperature (white point temperature) of >40° C.;
   the minimum film forming temperature being determined by differential scanning calorimetry according to DIN ISO 2115 (white point temperature) at a heating rate of 20 K/min.

2. The coating composition according to claim 1, wherein the polyol component (A) is a linear polyester polyol.

3. The coating composition according to claim 1, wherein the polyisocyanate component (B) is isophorone diisocyanate.

4. The coating composition according to claim 1, wherein the component (C) is N-(2-aminoethyl)-2-aminoethane sulphonic acid and the component (D) is diethanol amine.

5. The coating composition according to claim 1, wherein the olefin vinyl acetate copolymer (II) is ethylene vinyl acetate copolymer.

6. The coating composition according to claim 1, wherein the polyurethane and/or polyurethane-polyurea polymer (I) has a glass transition temperature of ≥−50° C. to ≤10° C., the glass transition temperature being determined by differential scanning calorimetry according to DIN 65467 at a heating rate of 20 K/min.

7. The coating composition according to claim 1, wherein the olefin vinyl acetate copolymer (II) has a minimum film forming temperature (white point temperature) of ≥50° C. to ≤90° C., the film forming temperature being determined according to DIN ISO 2115.

8. The coating composition according to claim 1, wherein the polymer formed by combining the polyurethane and/or polyurethane-polyurea polymer (I) and the olefin vinyl acetate copolymer (II) has a storage modulus G' at 50° C. and 1 rad/s of between $1*10^5$ Pa and $1*10^8$ Pa, the storage modulus being determined by means of oscillating rheometry in accordance with ASTM D 4440-08.

9. The coating composition according to claim 1, wherein the coating system is present in the form of an aqueous dispersion or in the form of a solid powder.

10. A method for joining surfaces, comprising
    providing a first surface and a second surface;
    at least partially applying the coating composition according to claim 1 to the first and/or second surface;
    contacting the first surface with the second surface so that the coating system is located between the first and the second surface to give a layered assembly;
    heating the layered assembly to a temperature of ≥50° C. and simultaneously applying a pressure of ≥1 bar to the layered assembly.

11. The method according to claim 10, wherein the first surface is an aluminum surface or polyethylene terephthalate surface or a surface made of cardboard and plastic and the second surface is a polyolefin surface.

12. The method according to claim 10, wherein the first surface and/or the second surface have a critical surface energy $\sigma_c$, determined according to DIN 55 660-2, of ≤40 mN/m.

13. The method according to claim 10, wherein the coating system according to claim 1 is applied in the form of an aqueous dispersion and dried at a temperature of ≥20° C. to ≤70° C. prior to the next step.

14. The method according to claim 10, wherein in the step of heating the layered assembly the layered assembly is heated to a temperature of ≥70° C. to ≤220° C.

* * * * *